Patented Apr. 23, 1935

1,999,110

UNITED STATES PATENT OFFICE 1,999,110

PRIMARY DITERPENE-ALCOHOL

Leopold Ruzicka, Zurich, Switzerland, assignor to Society of Chemical Industry in Basle, Basel, Switzerland No Drawing. Application March 2, 1934, Serial No. 713,777. In Switzerland March 3, 1933

3 Claims. (Cl. 260—153)

Compounds having a carbon skeleton, such as has been supposed by P. Karrer, R. Morf and K. Schöpp, Helvetica Chimica Acta 14, 1434, (1931) to be the most probable structure of vitamine A have not hitherto been accessible. By the present invention there are made unsaturated monocyclic primary diterpene alcohols closely related to vitamine A in accordance with the following scheme:—

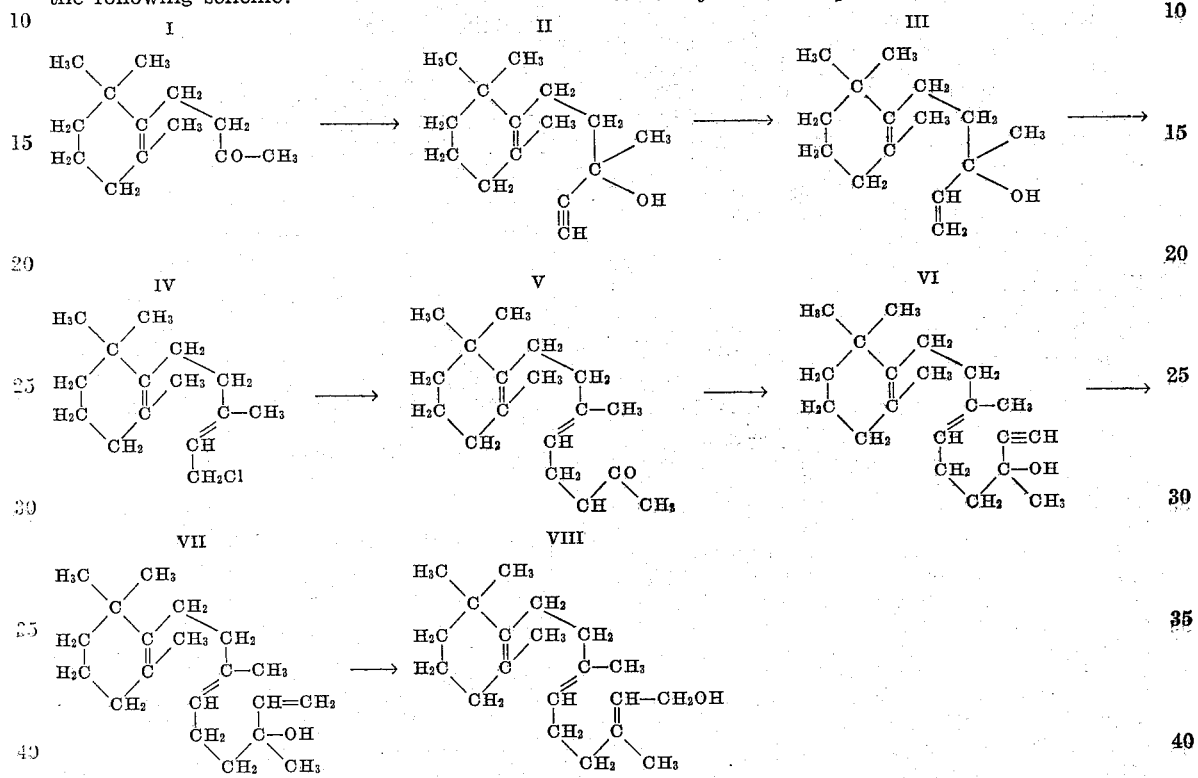

Dihydro-β-ionone (Formula I) which can be made by partial catalytic hydrogenation of β-ionone, is caused to react in known manner with alkali amide and acetylene and the acetylene alcohol II reduced to the tertiary alcohol III. The reduction may be effected, for example, catalytically with hydrogen and nickel or with sodium in moist ethereal solution. The tertiary alcohol III yields by reaction with an inorganic acid halide, such as phosphorus pentachloride, accompanied by isomerization, the halide IV which; after reaction with aceto-acetic ester and ketone scission of the condensation product, for instance with barium hydroxide in the usual manner, yields the ketone V. The latter by condensation with acetylene in presence of alkali amide, as well as by the partial hydrogenization, conducted as described above, of the acetylene alcohol VI passes into the tertiary diterpene-alcohol VII. This is transposed by heating it with an acid anhydride, for instance acetic anhydride, into the ester of the isometric diterpene-alcohol VIII. By alkaline saponification of the ester and purification of the product of the saponification, for example by esterification with phthalic acid anhydride and saponification of the phthalic acid ester thus obtained, there is isolated the desired alcohol VIII.

In like manner by starting from dihydro-α-ionone of the formula

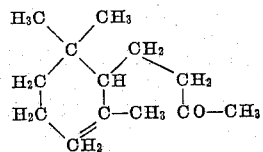

an isomeric series of compounds is produced which differ from the products expressed by the Formulæ I to VIII in the position of the double bond in the ring in the same way that dihydro-β-ionone differs from dihydro-α-ionone.

The new alcohols find use as such or as intermediate products for making physiologically active preparations, particularly of vitamine A.

The following example illustrates the invention:—

1. 330 grams of dihydro-β-ionone (I) are dissolved in 5 times this weight of absolute ether and there are gradually added to the solution while it is cooled with ice and salt, 100 grams of finely powdered sodium amide. Into this mixture, while stirring, is passed a dry stream of acetylene until the mixture is saturated therewith. To isolate the product ice-water is added, the ethereal layer is separated and dried with sodium sulfate and distilled. The acetylene carbinol II thus obtained boils at 135° C under 10 mm pressure and its specific gravity is $d_4^{20}=0.936$.

2. The acetylene carbinol II is dissolved in twice its weight of ethanol and hydrogenated in presence of a nickel catalyst with hydrogen until 1 mole hydrogen has been absorbed. The quantitatively formed tertiary alcohol III is isolated in the usual manner. It boils at 134° C. under 10 mm pressure and its specific gravity is $d_4^{20}=0.924$.

The acetylene carbinol II may also be hydrogenated by the action of sodium in moist ether. It is dissolved in 10 times its weight of ether, an equal weight of shredded sodium is added and to the whole ice is added, gradually while stirring and cooling, until the whole of the sodium has been dissolved by the water thus introduced. The tertiary alcohol III obtained in this manner has the same properties as those of the alcohol III obtained by catalytic reduction.

3. The tertiary alcohol III is dissolved in three times its weight of petroleum ether and the solution is mixed gradually, while stirring and cooling with ice and salt, with one mole of phosphorus penta-chloride. When the reaction is complete thorough washing with water and sodium carbonate solution follow. The chloride IV is sufficiently pure after evaporation of the petroleum ether for being further worked up. It has a chlorine content of 14.8 percent, and its specific gravity is $d_4^{20}=0.976$. It decomposes on distillation.

4. 67 grams of sodium are powdered under xylene and then caused to react with a solution of 380 grams of acetoacetic ester in double its weight of benzene until the reaction is complete. The sodium acetoacetic ester thus made is then boiled with 1 mole of the chloride IV until a sample of the mixture no longer gives an alkaline reaction to water. The condensation product which is obtained in a good yield boils at about 165° C. under 0.4 mm pressure. For the ketone scission the condensation product is dissolved in 4 times its weight of ethanol and the solution is boiled for 2 days with one of 1½ times its weight of crystallized barium hydroxide in 10 times its weight of water. Working up is as usual. The ketone V boils at 130-132° C. under 0.2 mm pressure.

5. The reaction of the ketone V with acetylene is conducted in exactly the same manner as described above under 1. The acetylene alcohol VI thus obtained boils at 125° C. under 0.1 mm pressure and its specific gravity is $d_4^{20}=0.933$.

6. The reduction of the acetylene carbinol VI to the tertiary alcohol VII is conducted in the same manner as described under 2. The product obtained boils at 124-126° C. under 0.2 mm pressure and its specific gravity is $d_4^{20}=0.914$.

7. For obtaining the final product VIII, the tertiary alcohol VII is mixed with 1½ times its weight of acetic anhydride and the mixture is boiled for 20 hours, and the product, after it has been freed from the constituents by heating it in a vacuum to 100° C. is saponified by boiling it with alcoholic lye. From the saponification product the primary alcohol is obtained in the usual manner by heating with phthalic anhydride to 100° C., then filtering and saponifying the phthalic acid ester thus formed; the alcohol is apt to retain halogen, which can be eliminated however by treating the alcohol with sodium in boiling methanol solution. The alcohol VIII forms a viscous oil boiling at 136-138° C. under 0.1 mm pressure. Its specific gravity is $d_4^{20}=0.930$.

The series of operations described under 1 to 7 is similar when dihydro-α-ionone is under treatment. The physical constants and the yields of the intermediates and the final product of the α-series expressed by the figures II' to VII' are nearly the same as those of the β-isomerides II to VII produced from dihydro-β-ionone. The following values have been found:—

II' $b_{10}$ 135°C., $d_{20}$ 0.937,
III' $b_{10}$ 134° C., $d_{20}$ 0.924,
IV' chlorine content about 15.0 per cent, $d_{20}$ 0.978,
V' $b_{0.2}$ about 130° C.
VI' $b_{0.1}$ 128° C., $d_{20}$ 0.934,
VII' $b_{0.2}$ 124-126° C., $d_{20}$ 0.918,
VIII' $b_{0.1}$ 136-138° C., $d_{20}$ 0.929.

What I claim is:—

1. Primary diterpene-alcohols of the formula

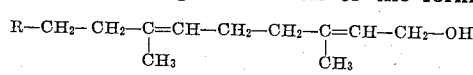

wherein R means a partially hydrogenated benzene ring containing one double bond and one methyl group in α-position and two methyl groups in α'-position to the side chain, which products form viscous oils and are closely related by structure to vitamine A.

2. A primary diterpene-alcohol of the formula

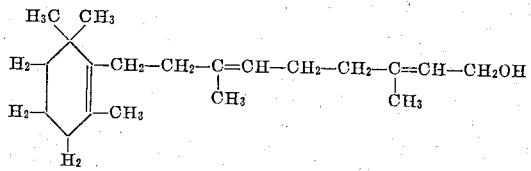

which product forms a viscous oil of the specific gravity $d_4^{20}=0.930$, boiling at 136-138° C. under 0.1 mm pressure, and is closely related by structure to vitamine A.

3. A primary diterpene-alcohol of the formula

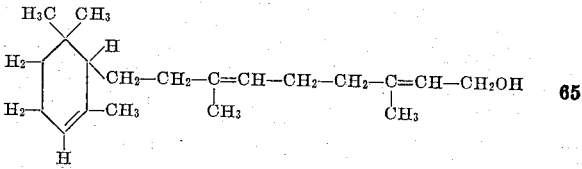

which product forms a viscous oil of the specific gravity $d_4^{20}=0.929$, boiling at 136-138° C. under 0.1 mm pressure, and is closely related by structure to vitamine A.

LEOPOLD RUZICKA.